United States Patent Office 3,041,358
Patented June 26, 1962

3,041,358
PREPARATION OF 17α-METHYLETIANIC ACIDS
Romano Deghenghi, Westmount, Quebec, Canada, assignor to American Home Products Corporation, New York, N.Y., a corporation of Delaware
No Drawing. Filed June 26, 1961, Ser. No. 119,318
8 Claims. (Cl. 260—397.1)

This invention relates to a new and surprisingly simple and direct method of preparing 17α-methyletianic acids. The 17α-methyletianic acids I may prepare by the process of this invention include 3-keto-Δ⁴-androstene-17α-methyl-17β-carboxylic acid, the 3-hydroxy-Δ⁵-androstene-17α-methyl-17β-carboxylic acids, and the 6-fluoro derivatives of these.

The compounds of this invention are valuable as intermediates for the synthesis of pharmacologically useful steroids. For example, 17α-methylprogesterone is a powerful progestin having about three times the activity of progesterone. It is readily synthesized by either of several routes from 17α-methyl-4-androstene-3-one-17β-carboxylic acid; however, because this acid has previously been difficult to obtain, the synthesis of 17α-methylprogesterone is ordinarily carried out by an elaborate 10-step synthesis from pregnenolone. (See Fieser and Fieser, Steroids, pp. 560–562.)

Steroidal 17α-methyletianic esters are easily prepared by the Favorskii rearrangement reaction applied to halogenated progesterones and halogenated pregn-5-ene-3-ol-20-ketones in which one, and only one of the hydrogen atoms on carbon atoms 17 and 21 is replaced by a halogen atom. However, these etianic esters are extremely resistant to hydrolysis, and are therefore unsatisfactory starting materials for the described etianic acids.

I have found, surprisingly, that I can form 17α-methyletianic acids (in the form of their alkali metal salts) by treating halogenated progesterones or halogenated pregn-4-ene-3-ol-20-ketones in which one, and only one, of the hydrogen atoms on carbon atoms 17 and 21 has been replaced by chlorine, bromine, or iodine, which alkali metal hydroxides in the presence of a mixture of water with a water-miscible neutral organic solvent free of primary hydroxyl groups. Such water-miscible neutral organic solvents suitable for employment in the practice of this invention include ketones such as acetone and methylethyl ketone, cyclic ethers such as 1,4-dioxane, 1,3-dioxane, and tetrahydrofuran, polyethers such as diethylene glycol dimethyl ether and diethylene glycol diethyl ether, disubstituted amides such as dimethyl formamide, diethyl formamide, and dimethyl acetamide, nitriles, such as acetonitrile, secondary and tertiary alcohols such as isopropanol and tertiary butanol, and sulfoxides such as dimethylsulfoxide; primary alcohols are entirely unsuitable, since in their presence, the etianic esters are formed. Especially preferred solvents in this process are acetone, dimethyl formamide, and dimethyl sulfoxide; in most cases, acetone is the most preferred solvent.

Among the steroidal 20-ketones having halogen alpha to the 20-keto group which may be converted to the corresponding etianic acids by the process of this invention are 17α-chloroprogesterone, 17α-bromoprogesterone, 21-chloroprogesterone, 21-bromoprogesterone, 21-iodoprogesterone, 3β-hydroxy-17α-bromo-20-ketopregn-5-ene, 3β-hydroxy-17α-chloro-20-ketopregn-5-ene, 3β-hydroxy-20-keto-21-chloropregn-5-ene, 3β-hydroxy-20-keto-21-bromopregn-5-ene, and 3β-hydroxy-20-keto-21-iodopregn-5-ene. Similar compounds having fluorine as the halogen at 17 or 21 undergo the same conversion, but much more slowly; accordingly, they are considerably less desirable as starting materials for this synthesis.

Additionally, 17 or 21-halogenated-3-oxygenated-pregnane-20-ones may be converted by my process into 3-oxygenated-17α-methylandrostane 17β-carboxylic acids.

Substitution of a halogen atom, e.g., a fluorine atom in the 6-position of the above steroids is possible, and leads to the production of a 6-halo-17α-methyletianic acid. Likewise, steroids corresponding to the above starting materials in which the 3-oxygen function is protected by ketalization, e.g., as with ethylene glycol, or by esterfication with a lower aliphatic acid of from one to six carbon atoms, may also be employed, and undergo conversion to etianic acids; in some cases, the 3-acyloxy radicals may be partially or completely hydrolyzed, but may be restored, if desired, by known means.

A convenient means of practicing this invention comprises adding a solution of an α-bromo steroidal 20-ketone of the pregnane series in the water-miscible neutral organic solvent, e.g., acetone, to a concentrated aqueous solution of an alkali metal hydroxide containing a substantial molar excess of base, and shaking the resulting two-phase mixture for a short time at room temperature. The resulting suspension may be diluted with water, extracted with a water immiscible solvent to remove unchanged starting material or other neutral products if present, and then acidified with a strong acid to precipitate the crude 17α-methyletianic acid, which may then be filtered, dried, and recrystalized from any suitable solvent, such as, for example, methanol, separating it in this manner from small amounts of the 17β-isomer. Preferably, the alkali treatment is continued until the alkali-insoluble layer shows a negative Beilstein test.

In some instances a portion of the starting material is simultaneously transformed into a D-homosteroid; thus, in addition to the 17α-methyl-4-androstene-3-one-17β-carboxylic acid formed by the procedure of Example 1, below, a small amount of 17-keto-17aβ-methyl-17aα-hydroxy-D-homo-4-androstene-3-one is formed, and may be recovered from the ether extract of the alkaline reaction mixture.

The following examples illustrate this invention.

Example 1

To a solution of 5.00 g. of 17α-bromoprogesterone in 60 ml. of acetone, there is added a solution of 5.0 g. of sodium hydroxide in 15 ml. of water. The resulting two-phase system is shaken at room temperature for one hour. The resulting crystalline suspension is diluted with 100 ml. of water and extracted with 100 ml. portions of ether. The alkaline layer is poured into 200 ml. of ice-cold 0.2 normal hydrochloric acid. A slightly colored precipitate of crude 17α-methyl-4-androstene-3-one-17β-carboxylic acid is collected, dried, and crystallized from about 100 ml. of methanol to give about 2 grams of a pure etianic acid, M.P. 305–308° C., $[\alpha]_D + 83.8°$ (in dioxane). Corresponding values recorded by Engel and Just, J. Am. Chem. Soc., 76, 4909 (1954) are M.P. 302–305° C., $[\alpha]_D + 85°$.

From this acid, 17α-methylprogesterone may be prepared in approximately 60% yield by the method of Günthard et al., Helv. chim. acta, 35, 2437 (1952).

Example 2

To a solution of 1.00 g. of 6α-fluoro-17α-bromo-progesterone in 25 ml. acetone, there is added a solution of 2.00 g. sodium hydroxide in 6 ml. of water. The resulting two-phase system is shaken at room temperature for sixteen hours.

The alkaline layer was diluted with about 10 ml. water, extracted with 25 ml. portions of ether, and poured into a cold dilute solution of hydrochloric acid. A slightly colored precipitate of crude 17α-methyl-6α-fluoro-4-androstene-3-one-17β-carboxylic acid is collected and dried, weighing 475 mg., M.P. 275–280° C. (from MeOH—H₂O) λ max. 238 mμ; log_e 4.12.

*Example 3*

Following the procedure of Example 1, 1.00 g. of 17α-bromo-5-pregnene-3β-ol-20-one in 15 ml. of acetone was allowed to react with 1 g. NaOH in 3 ml. of water for one hour.

The alkaline layer was acidified and about 600 mg. of crude acid was collected on a filter and dried. The 17α-methyl-5-androstene-3β-ol-17β-carboxylic acid was isolated in the pure state by fractional crystallization.

*Examples 4 to 9*

Five gram portions of 17α-bromoprogesterone were stirred for one hour with twenty gram portions of 25% aqueous sodium hydroxide with each of six different water miscible solvents in amounts and at temperatures shown in the following table:

| Example No. | Solvent | Solvent Volume, ml. | Temperature, °C. | Wt. of crude acid |
|---|---|---|---|---|
| 4 | 1,4-Dioxane | 60 | 25 | 0.94 |
| 5 | Dimethylformamide | 60 | 25 | 2.35 |
| 6 | Diethyleneglycol diethyl ether | 60 | 50 | 0.97 |
| 7 | Dimethyl sulfoxide | 60 | 50 | 3.88 |
| 8 | Isopropanol | 100 | 25 | 1.00 |
| 9 | Tertiary Butanol | 100 | 25 | 1.00 |

The product of Example 2, 17α-methyl-6α-fluoro-4-androstene-3-one-17β-carboxylic acid may be converted via reaction of its acid chloride with cadmium methyl into 6α-fluoro-17α-methylprogesterone, a powerful oral progestational agent.

I claim:

1. A process of preparing a steroidal 17α-methyletianic acid selected from the group consisting of 3-keto-17α-methyl-Δ⁴-androstene-17β-carboxylic acid, 3β-hydroxy-17α-methyl-Δ⁵-androstene-17β-carboxylic acid, and the 6-fluoro derivatives of these, which comprises contacting a solution of a halogenated steroidal 20-ketone of the pregnane series selected from the group consisting of 21-haloprogesterones, 17α-haloprogesterones, 3β-hydroxy-21-halopregn-5-ene-20-ketones, 3β-hydroxy-17α-halopregn-5-ene-20-ketones, and the 6-fluoro derivatives of these, in a water-miscible neutral organic solvent free of primary hydroxyl groups with a concentrated aqueous solution of an alkali metal hydroxide, agitating the resulting mixture until the non-aqueous layer gives a negative Beilstein test, diluting the reaction mixture with water, extracting the diluted mixture with ether, acidifying the aqueous layer with a strong acid, to liberate the steroidal 17α-methyletianic acid, and separating said 17α-methyletianic acid from the said acidified aqueous layer.

2. A process according to claim 1 in which the halogenated steroidal 20-ketone is 17α-bromoprogesterone.

3. A process according to claim 1 in which the halogenated steroidal 20-ketone is 6α-fluoro-17α-bromoprogesterone.

4. A process according to claim 1 in which the halogenated steroidal 20-ketone is 17α-bromo-5-pregnene-3β-ol-20-one.

5. A process according to claim 1 in which the water-miscible neutral organic solvent is acetone.

6. A process according to claim 1 in which the water-miscible neutral organic solvent is dimethyl sulfoxide.

7. A process according to claim 1 in which the water-miscible neutral organic solvent is dimethyl formamide.

8. 17α-methyl-6α-fluoro-4-androstene-3-one-17β-carboxylic acid.

References Cited in the file of this patent

UNITED STATES PATENTS 2,369,065   Marker et al. _____ Feb. 6, 1945